United States Patent

[11] 3,610,644

| [72] | Inventors | Linwood B. Swanson<br>Newington;<br>Gordon W. Smithson, West Hartford, both of Conn. |
|---|---|---|
| [21] | Appl. No. | 863,932 |
| [22] | Filed | Oct. 6, 1969 |
| [45] | Patented | Oct. 5, 1971 |
| [73] | Assignee | Cushman Industries, Incorporated<br>Hartford, Conn. |

[54] HEAVY-DUTY CHUCK
9 Claims, 7 Drawing Figs.

[52] U.S. Cl. ..................................... 279/1 H,
74/424.8, 279/1 ME, 279/110, 279/112
[51] Int. Cl. ..................................... B23b 31/16
[50] Field of Search ........................................ 279/112,
110, 66, 1, 1 ME, 119, 1 H; 308/230, 233;
74/424.8

[56] References Cited
UNITED STATES PATENTS

| 1,548,949 | 8/1925 | Horton | 279/1 H |
| 1,971,537 | 8/1934 | Sloan et al. | 279/119 |
| 2,245,384 | 6/1941 | Bullard | 279/112 |
| 2,821,405 | 1/1958 | Becker | 279/119 |
| 2,822,179 | 2/1958 | Bärwinkel | 279/112 |
| 3,485,110 | 12/1969 | Beck | 74/424.8 |

*Primary Examiner*—William S. Lawson
*Assistant Examiner*—James F. Coan
*Attorney*—Walter Spruegel ABSTRACT: At least one of the jaws of a chuck is movable to and from clamping engagement with work by being carried by one of the nut and screw elements of a ball bearing screw assembly which is guided for axial movement but held against rotation, so that on rotation of the other, axially immovable, element the one jaw is by its carrying element moved to and from the work through intermediation of the complement of bearing balls of the assembly.

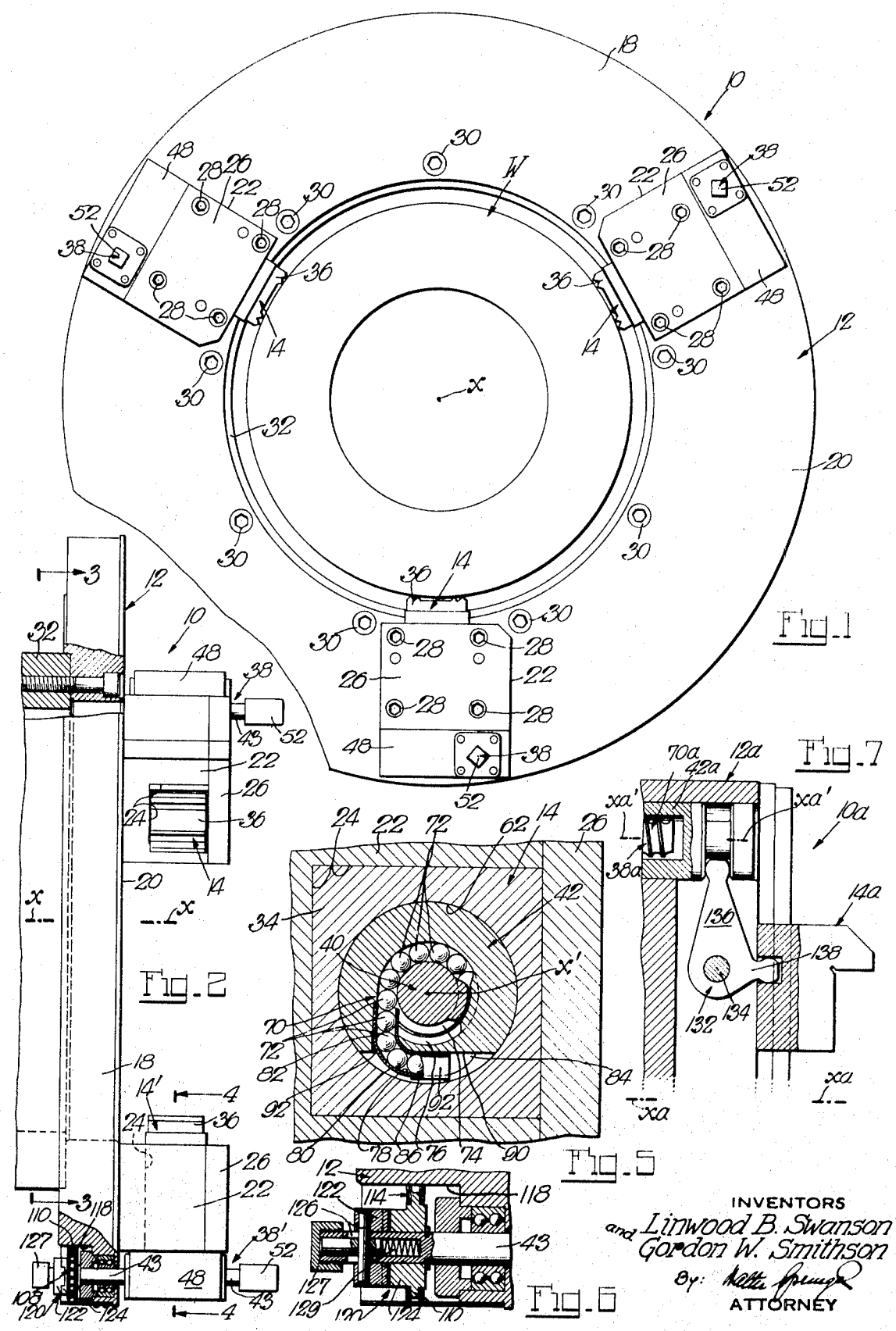

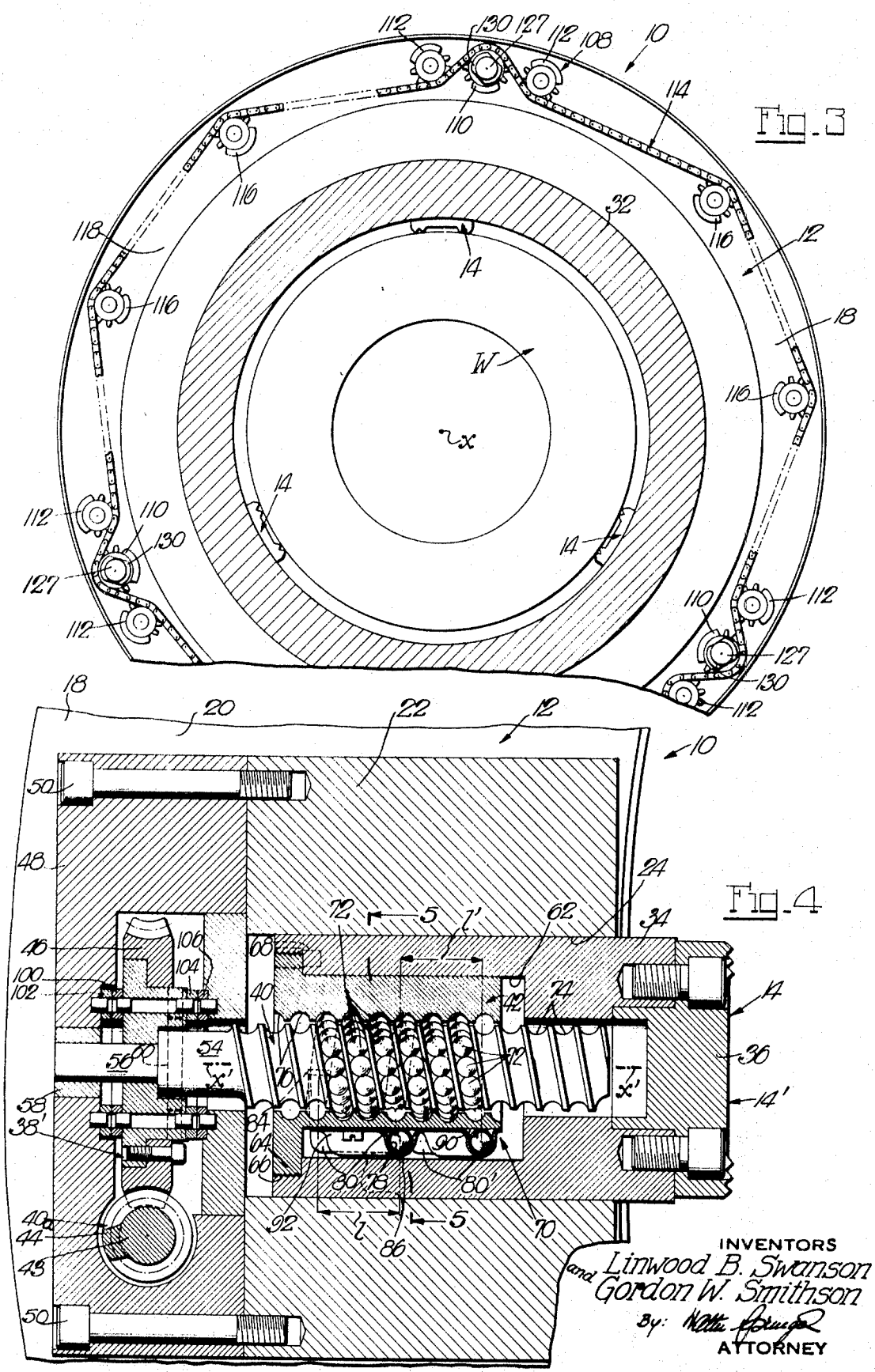

HEAVY-DUTY CHUCK

The type of chuck with which the present invention is concerned is required to exert with its jaws thrust forces of particularly high magnitudes for centering heavy work and for driving the same against any, including the heaviest, resistance, encountered in a machining or other operation thereon. There are chucks of this general type, but these fall far short of exerting jaw thrust of the high magnitudes contemplated for many applications. This is due to the fact that in these chucks the usual screw-type torque drive of the jaws is inherently subject to very high sliding friction when converting the applied torque into jaw thrust of high magnitude against a workload, wherefore the conversion of applied torque into jaw thrust is of low efficiency in any event, and is far too low for practical attainment of jaw thrust of the contemplated high magnitudes. Further, owing to the required high torque application to the drive of each jaw to attain jaw thrust of the higher magnitudes of which these chucks are capable, such torque must be applied to each jaw drive individually, wherefore these chucks lack any of the advantages of a universal chuck of characteristic simultaneous operation of all jaws.

It is the primary object of the present invention to provide a chuck of this type in which on exertion of torque within a wide range of magnitudes easily applied to the drive of each jaw, the thrust against a workload by each jaw will in magnitude vary within a wide range, including magnitudes far greater than those attainable in prior chucks of this type and even surpassing the highest magnitudes contemplated for any applications at this time.

It is another object of the present invention to provide a chuck of this type of which the jaw thrust against the work may be within the aforementioned wide range of magnitudes, by arranging each jaw drive to perform according to the basic principle of a screw and cooperating nut, but to keep operational friction in the drive under any conditions at very low levels by transmitting the operational forces of any, including the highest, magnitudes between the parts of the drive solely through featured interposed bearing balls which are free to roll much like those of a ball bearing transmitting forces of the same magnitudes at characteristically low rolling friction. Thus, it is this low operational rolling friction of the ball bearing action in each jaw drive which permits conversion of by far the greater part of torque of readily applied magnitude into jaw thrust of most any, and easily including the highest contemplated, magnitudes.

It is a further object of the present invention to provide a chuck of this type in which each jaw drive of the aforementioned featured ball bearing action is embodied in a structurally simple form of contemplated minimum departure from a heavy-duty screw-type jaw drive, by using in lieu of, and as a ready local replacement for a threaded-action screw and follower nut thereon a featured ball bearing action assembly. This ball bearing screw unit features companion screw and nut parts and a complement of bearing balls, of which the screw and nut parts are provided, not with meshing threads, but rather with helical companion races for the balls, and these races are formed as an endless path in which the balls circulate in action of the unit. In carrying the objective of a structurally simple drive of each jaw still further, and keeping in mind that jaw thrust forces of very high magnitudes are to be attained on readily applicable, and hence relatively low, input torque to the drive, each jaw drive is in its simplest and also preferred form in the chuck body reduced to a torque input shaft with a worm, a worm gear in mesh with the worm, a guided master jaw, and the featured ball bearing screw unit of which the turnable but axially immovable part, preferably the screw part, is turnable with and driven by the worm gear, and the other part, i.e., the nut part, is operatively connected with the master jaw for joint travel with the same but against rotation relative thereto. The worm and worm gear are part of this preferred drive form because they may be selected for adequate self-locking action to prevent rotational backup of the screw part of the unit on very high thrust exertion of the jaw against a workload.

Another object of the present invention is to provide a chuck of this type in which the aforementioned simple drive of each jaw includes a thrust end on the screw part of the ball bearing screw unit, and a fixed thrust takeup surface in the chuck body against which the thrust end of the screw part bears with a force which increases with the thrust exerted by the associated jaw against a workload, with the thrust surface and the thrust end of the screw part being of a material or materials of a relatively high coefficient of friction so as to serve as an effective brake against backup of the screw part on thrust exertion of the jaw against work, either to aid the self-locking worm and worm gear in the performance of this function or largely to perform this function alone if the input drive to this screw part is other than a self-locking worm and worm gear.

A further object of the present invention is to provide a chuck of this type in which the screw part of the featured ball bearing screw unit in each jaw drive is driven at a speed much reduced from that of the part to which the input torque is applied, so that jaw thrust of maximum rated magnitude is attained with input torque that is sufficiently low not just to permit, but even clearly indicate, adaptation of the chuck for universal action. In thus arranging the chuck for universal action, the same is also in point of efficient operation far superior to prior chucks of this type.

It is another object of the present invention to provide a chuck of the aforementioned universal action of which the torque input shafts of the drives of the aforementioned ball bearing action of the individual jaws are drivingly connected, and at least one of these input shafts is provided with a drive head for ready engagement with a high-speed reversible power wrench of controlled, and preferably also presettable, torque output. With this arrangement, the jaws will, on application of the power wrench to the drive head and exertion of its preset torque, quickly center work, even if one of the jaws is to lift the work into centered position, and grip the work with adequate force to drive the work against whatever resistance it encounters in a machine or other operation thereon after the power wrench is retracted from the drive head.

It is a further object of the present invention to provide a universal-action chuck of this type which may quickly be adapted to individual action of any one or all of the jaws for any purpose, such as throwing one or more jaws out of center for a particular operation on work, for example, and which may as quickly be restored to universal action. This is achieved in simple and preferred manner by interposing between each of the torque input shafts of the drives of the individual jaws and their aforementioned driving connection for universal jaw action a clutch which, when engaged and disengaged, makes for universal and individual action, respectively, of the associated jaw, with each torque input shaft being further provided with the aforementioned drive head for access with a manual tool for individual action of the associated jaw.

Another object of the present invention is to provide a universal-action chuck of this type of which the driving connection between the torque input shafts of the drives of the individual jaws for universal jaw action is a simple chain drive which lends itself to operation at fairly high speed and at the same time is sufficiently rugged to withstand for the longest time whatever shock it is subjected to on coming to a rather sudden stop whenever the jaws exert their full gripping force on work, with this chain drive involving, besides a single chain, an operating sprocket on each torque input shaft and a minimum number of idler sprockets for guiding and tensioning the chain.

A further object of the present invention is to provide a chuck of this type of the aforementioned selective universal or individual jaw action with the interposed clutches in the jaw drives, and having the aforementioned chain drive for universal jaw action, of which the operating sprockets of the chain drive are provided simply and conveniently directly on those of the companion members of the clutches which are the driving members in universal jaw action and are freely turnable on the respective torque input shaft, while their companion driven members are splined on these torque input shafts and slidable into and from engagement with their companion driven members.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a front view of a chuck embodying the present invention;

FIG. 2 is a side view, partly in section, of the chuck

FIG. 3 is a section taken substantially on the line 3—3 of FIG. 2;

FIG. 4 is an enlarged section through the chuck taken on the line 4—4 of FIG. 2;

FIG. 5 is a section taken on the line 5—5 of FIG. 4;

FIG. 6 is an enlarged section through part of the chuck; and

FIG. 7 is a fragmentary section through a chuck embodying the invention in a modified manner.

Referring to the drawings, and more particularly to FIGS. 1 to 4 thereof, the reference numeral 10 designates a chuck having a body 12, a plurality of jaws 14, and jaw-operating mechanism. With the present chuck being adapted for work W which is particularly, though not exclusively, massive, the exemplary chuck body 12 is, for least bulk and weight, in the form of a base ring 18 on the front face 20 of which are mounted separate casings 22 for the individual jaws 14. Each of these casings 22 has a guideway 24 for a jaw 14 in which the latter is movable radially with respect to the chuck axis $x$ (FIGS. 1, 2 and 4), and a plate 26 which retains the jaw in the guideway 24, with each casing 22 and its plate 26 being conveniently bolted at 28 to the base ring 18 (FIG. 1). The chuck is with its base ring 18 removably mounted, as by bolts 30, to a power spindle 32 of a lathe (FIGS. 1 and 2).

Each jaw 14 provides the usual master jaw 34 and a thereto bolted top jaw 36, of which the master jaw 34 is movable in its guideway 24 in the chuck body 12, and the top jaw 36 is the work-gripping jaw (FIGS. 1, 2 and 4). The chuck is preferably furnished with top jaws of different lengths which may be substituted for the top jaws 36 shown to grip work of relatively widely varying cross-sectional dimensions.

The jaw-operating mechanism provides an individual drive 38 for each jaw 14 to move the latter and convert applied torque into jaw thrust against a workload. Since the jaw drives 38 are in this instance identical, only the drive 38 for the jaw 14' in FIGS. 2 and 4 will be described in detail, with parts to be referred to hereinafter of the other drives 38 being denoted by the same reference numerals. Thus, the jaw drive 38' provides companion screw and nut parts 40 and 42 with a common axis $x'$, of which one part, in this instance the screw part 40, is mounted in the chuck body for rotation about, but against movement in the direction of, the axis $x'$, *while the other part, i.e., the nut part 42, is mounted in the chuck body for movement in the direction of, but against rotation about, the axis $x'$*, with the jaw drive further providing means 40a for applying torque to the screw part 40, and an operating connection between the nut part 42 and jaw 14' for moving the latter on axial movement of the former. The torque applying means 40a are in the preferred from of a torque input shaft 43 with a worm 44, and a worm gear 46 in mesh with the worm 44, with these parts being arranged in an auxiliary casing 48 which at 50 is bolted to the associated body casing 22. The torque input shaft 43 is journaled in suitable bearings in the auxiliary casing 48 and carries outside the latter a drivehead 52 for releasable engagement with a suitable tool with which to apply torque. The screw part 40 extends with its rear end 54 into the auxiliary casing 48 and has a reduced shank 56 journaled in a bearing 58 in this casing 48, with the worm gear 46 being received on the rear end 54 and reduced shank 56 of the screw part 40, and being pinned to this rear end 54 as at 60 for rotation with the screw part 40.

The nut part 42 is mounted in the chuck body for movement in the direction of, but against rotation about, the axis $x'$, by arranging the companion screw and nut parts 40, 42 to extend with their axis $x'$ in the direction of movement of the jaw 14', and mounting the nut part 42 directly in the jaw 14' for movement therewith but against rotation relative thereto. To this end, the jaw 14' is provided with a recess 62 which is concentric with the axis $x'$ and fittedly receives the nut part 42 (FIGS. 4 and 5), with the nut part 42 having in this instance a rear flange 64 which at 66 is threadedly received in, and at 68 also pinned to, the jaw 14' so as to be locked against rotation relative to the latter.

In accordance with an important aspect of the present invention, the companion screw and nut parts 40 and 42, rather than having the usual threaded interengagement, are part of a ball bearing screw unit 70 which, besides the parts 40 and 42, has a complement of bearing balls 72 interposed between the parts 40, 42. The screw and nut parts 40 and 42 are in their outer and inner peripheral surfaces provided with outer and inner companion races 74 and 76 for the balls 72 (FIGS. 4 and 5), with these races 74 and 76 extending helically at the same uniform helix angle over the screw part 40 and conveniently throughout the length of the nut part 42, respectively. Provisions are made to circulate the balls 72 in their races over a given length of the nut part 42 in opposite directions on operation of the screw part 40 in opposite directions. In the present instance, one contingent of balls 72 is thus circulated over the length $l$ of the nut part 42 (FIG. 4), with these balls travelling in the inner and outer races 76 and 74 over the length $l$ to either end thereof, and being in a return path 78 directed to the other end of the length $l$ depending on the direction of operation of the screw part 40 (see also FIG. 5). The ball return path 78 is provided by a tubular member 80 in which the balls 72 are received, with this tubular member 80 being generally U-shaped to provide opposite legs 82 and 84 and a connecting part 86. As it appears from FIGS. 4 and 5, the leg 82 of the tubular member reaches into the inner race 76 in the nut part 42 at one end of the length $l$ of the latter, as well as sufficiently into the immediately adjacent part of the outer race 74 in the screw part 40, so as to divert balls 72 either from the inner and outer races 76 and 74 at that end of the length $l$ of the nut part into this leg 82, or from the latter into the inner and outer races 76, 74 at the same end of the length of the nut part, depending on the direction of operation of the screw part 40. The connecting part 86 of the tubular member 80 rests on a machined flat 90 on the nut part 42 and extends from the leg 82 rearwardly to the opposite end of the length $l$ of the nut part 42 and to the opposite side of the screw part 40 where the other leg 84 reaches into the inner and outer races 76, 74; thereat in the same manner the leg 82 reaches into these same races as shown in FIG. 5. Thus, depending on the direction of operation of the screw part 40, the balls 72 will be diverted from the inner and outer races 76, 74 at either end of the length $l$ of the nut part 42 into the tubular member 80, and will in the latter be returned to the same races at the other end of the length $l$ of the nut part 42, as will be readily understood. The legs 82 and 84 of the tubular member 80 are fittedly received in suitable locating recesses in the nut part 42, of which the recess 92 for the leg 82 is shown in FIG. 5, and the tubular member is with its connecting part 86 firmly mounted on the flat 90 on the nut part 42 by a screwed-on strap 92.

For adequate strength and least wear of the ball bearing screw unit 70 in converting torque into jaw thrust of high magnitudes against the workload, a second contingent of balls 72 is provided in the outer and inner races 74 and 76 in the screw and nut parts 40 and 42, with a ball return path being provided by another tubular member 80' for circulation of these balls in these races over the additional length $L'$ of the nut part 42 in operation of the screw part 40. The tubular member 80' is held against the flat 90 on the nut member 42 preferably by the same strap 92 which holds the other tubular member 80 on the flat 90.

In operation of either jaw drive 38, i.e., on turning the respective drivehead 52 with a wrench or other tool, the ball bearing screw unit 70 acts much like interthreaded screw and nut components, with this all-important difference, however, that the efficiency of this unit in converting torque into jaw thrust is incomparably higher than that of interthreaded screw and nut components. This is due to the fact that in transmitting the operational forces of any, including the highest, magnitudes between the parts of the drive, the operational friction in the ball bearing screw unit is very low. Thus, it is the low operational rolling friction of the ball bearing action in the unit 70 in each jaw drive which permits conversion of by far the greater part of torque of readily applied magnitude into jaw thrust of most any, and easily including the highest contemplated, magnitudes.

For operation of the chuck, work W is placed between the open jaws 14, and work of any, including quite heavy, weight may be rested on one of the jaws, such as the lowermost jaw in FIG. 1, for example, to be lifted thereby into centered position and uniform gripping engagement with all jaws 14 on applying torque to each jaw drive. Of course, the greater the thrust exerted by the jaws against the gripped work, the greater becomes the tendency of the screw part 40 of each jaw drive rotationally to back up once torque is no longer applied. Accordingly, provisions are made automatically to lock each jaw drive against such backup the moment torque application is discontinued. To this end, the companion worm and worm gear 44, 46 of each jaw drive are preferably self-locking. However, in dealing with jaw thrust of particularly high magnitudes, built-in friction in each jaw drive may additionally be resorted to in locking the same against backup. To this end, the worm gear 46 of each jaw drive carries a thrust ring 100, and the respective body casing 48 is provided with a thrust takeup surface on another thrust ring 102, with the screw part 40 and worm gear 46 having slight axial play sufficient for the thrust ring 100 thereon to back against the thrust takeup ring 102 under the applied jaw thrust on work. These rings 100 and 102 are of any suitable material of a preferably high coefficient of friction so as to serve as an effective brake against rotational backup of the jaw drive under the applied jaw thrust on work. Of course, built-in friction in each jaw drive such as afforded by the rings 100 and 102 may solely be relied on to lock the drive against rotational backup under the applied jaw thrust on work, if the worm and worm gear 44, 46 were not self-locking or other drive means used in lieu thereof. To confine the screw part 40 and worm gear 46 thereon to the desired slight axial play, further rings 104 and 106 are provided on the worm gear 46 and in the body casing 48 (FIG. 4).

With the preferred use of the companion worm and worm gear 44, 46 in transmitting the applied torque to the screw part 40 of each jaw drive 38, this screw part is driven at a speed much reduced from that of the drivehead 52 to which the input torque is applied, so that jaw thrust of maximum rated magnitude is attained with input torque that is sufficiently low to permit adaptation of the chuck for highly advantageous universal jaw action. To this end, the input shafts 43 of the jaws drives 38 have a drive connection 108 (FIG. 3) so that on applying torque to the drivehead 52 of any jaw drive all jaw drives will simultaneously be operated for uniform movement of all jaws 14 in closing or opening direction. The drive connection 108 is in this instance in the form of a chain drive, having drive sprockets 110 on the input shafts 43 of the jaw drives 38, idler sprockets 112 which are rotatably mounted on the chuck body 12 in the rear thereof and arranged in pairs, of which those of each pair are located on opposite sides of, and in fairly close proximity to, the drive sprocket 110 on each input shaft 43, and a chain 114 which passes over the sprockets 110 and 112. The chain drive further provides guide sprockets 116 over which the chain 114 also passes and which confine the chain in the peripheral recess 118 in the rear of the chuck body (FIGS. 2 and 3). For universal jaw action of the chuck, a preferred high-speed reversible power wrench of controlled, and preferably also presettable, torque output is applied to the drivehead 52 of either one of the jaw drives 38. Once the jaw grip work on their universal closure, the power wrench is removed, whereupon each jaw drive will remain locked against rotational backup under the applied jaw thrust on the work, as explained. Of course, the power wrench is also used in releasing the jaws from work.

Preferably and advantageously, provisions are also made for individual action of each jaw 14 for any desired purpose. To this end, there is interposed between the torque input shaft 43 of each jaw drive 38 and the drive sprocket 110 thereon an engageable and disengageable clutch 120 having companion members 122 and 124, of which member 122 is at 126 splined to the recessed rear end of the input shaft 43, and member 124 turns loosely on this input shaft and is in this instance also formed integrally with the drive sprocket 110 (see also FIG. 6). Thus, when the clutches 120 associated with the jaw drives 38 are engaged (FIG. 6) the chuck is set for universal jaw action. However, on disconnecting the clutch 120 associated with any jaw drive 38, by loosening a cap 127 on the rear end of the input shaft 43 and permitting a spring 129 to retract clutch member 122 from engagement with the axially immovable companion member 124, the particular jaw drive may be operated individually, by applying a wrench or other tool to the drivehead 52 on the input shaft 43.

While in the described chuck 10 the jaws move rectilinearly together with the nut parts of the ball bearing screw units 70 of the jaw drives, these ball bearing screw units may be used with all the explained advantages in other chucks with different jaw movements. FIG. 7 shows an example of another chuck 10a in which each jaw 14a is guided on the chuck body 12a for movement radially of the chuck axis xa, but the common axis xa' of the ball bearing screw unit 70a of each jaw drive 38a extends parallel to the chuck axis xa, and each jaw drive 38a further includes a rocker 132 which at 134 is pivoted in the chuck body 12a, and is in the form of a bellcrank lever with diverging arms 136 and 138 that are operatively connected with the nut part 42a of the unit 70a and the associated jaw 14a in the exemplary manner shown. The present chuck 10a has this further advantage that by making the arm 136 of the rocker 132 for each jaw longer than the other arm 138 thereof, the thrust exerted by the jaw against a workload is greater than that exerted by the ball bearing screw unit 70a against the rocker 132.

While in the described chuck 10 the thrust rings 100 and 102 are resorted to for increased lock of each jaw drive against backup under particularly high jaw thrust, it is, of course, feasible and advantageous to use in lieu of these thrust rings antifriction thrust bearings for chuck applications in which the companion worm and worm gear of each jaw drive lock the latter against backup under the applied jaw thrust.

We claim:

1. In a chuck, the combination with a plurality of companion jaws, and a chuck body carrying jaws of which at least one jaw is mounted for movement to bring work to and from gripping engagement with said jaws, of a drive for moving said one jaw, including a unit having companion screw and nut parts with a common axis and bearing balls, said screw and nut parts having outer and inner helical races, respectively, for said balls, with said nut part having also a ball return passage between axially spaced portions of said inner race to form with the latter an endless ball path, one of said parts being mounted in said body against rotation about, but for movement in the direction of, said axis, and the other part being mounted for rotation about, but against movement in the direction of, said axis, an operative connection between said one part and said one jaw to move the latter on axial movement of said one part, means for applying torque to said other part, and means locking said other part against rotational give under any applied work-gripping force of said one jaw, comprising a thrust end surface on said other part and a fixed thrust takeup surface in said body, with said other part having limited axial play and said surfaces being of materials of high coefficients of friction, so that on thrust exertion of said one jaw against work and ensuing backup of said other part with its thrust end surface into forced engagement with said thrust takeup surface said surfaces will serve as a brake against rotational give of said other part.

2. The combination in a chuck as in claim 1, in which said torque-applying means are a torque input shaft in said body carrying a worm, and a worm gear meshing with said worm and turning with, but being axially immovable relative to, said other part, said thrust end surface is a thrust face on said worm gear and said face and surface being of materials of high coefficients of friction to serve as a brake against rotational give of said worm gear on thrust exertion of said one jaw against work and ensuing backup of said other part and worm gear with its thrust face into forced engagement with said thrust takeup surface.

3. The combination in a chuck as in claim 2, in which said worm and worm gear are also self-locking.

4. In a chuck, the combination with a plurality of companion jaws, and a chuck body carrying said jaws for movement to bring work to and from gripping engagement with said jaws, of a drive for simultaneously moving said jaws, including for each jaw a unit having companion screw and nut parts with a common axis and bearing balls, said screw and nut parts having outer and inner helical companion races, respectively for said balls, with said nut part having also a ball return passage between axially spaced portions of said inner race to form with the latter an endless ball path, one of said parts being mounted in said body against rotation about, but for movement in the direction of, said axis, and the other part being mounted for rotation about, but against movement in the direction of, said axis, an operative connection between said one part and associated jaw to move the latter on axial movement of said one part, means locking said other part against rotational give under any applied work-gripping force of the associated jaw, a drive connection between said other parts of said units for universal action of said jaws on the drive of said other part of one of said units, and means for applying torque said other part of said one unit, with said drive connection including connect and disconnect means for each unit for individual operation of said other part of any unit disconnected from said drive connection.

5. In a chuck, the combination with a plurality of companion jaws, and a chuck body carrying said jaws for movement to bring work to and from gripping engagement with said jaws, of a drive for simultaneously moving said jaws, including for each jaw a unit having companion screw and nut parts with a common axis and bearing balls, said screw and nut parts having outer and inner helical companion races, respectively, for said balls, with said nut part having also a ball return passage between axially spaced portions of said inner race to form with the latter an endless ball path, one of said parts being mounted in said body against rotation about, but for movement in the direction of, said axis, and the other part being mounted for rotation about, but against movement in the direction of, said axis, a torque input shaft drivingly connected with said other part thereof, an operative connection between said one part and associated jaw to move the latter on axial movement of said one part, means locking said other part against rotational give under any applied work-gripping force of the associated jaw, with said shafts of said units extending parallel to each other, a drive connection between said other parts of said units for universal action of said jaws on the drive of said other part of one of said units, with said drive connection being a chain drive including a sprocket on each shaft and a chain passing over said sprockets, and means for applying torque to said other part of said one unit.

6. The combination in a chuck as in claim 5, in which said shaft of said one unit is provided with a head for releasable driving connection with a power wrench.

7. The combination in a chuck as in claim 5, in which each unit is further provided with an engageable and disengageable clutch intermediate said shaft thereof and associated sprocket for individual action of the associated jaw on disconnection of said clutch.

8. The combination in a chuck as in claim 7, in which each clutch has companion members, of which one member turns freely, but is held against axial movement, on the shaft of the respective unit and turns with the associated sprocket, and the other member is splined to said shaft and shiftable into and from driving engagement with said one member.

9. The combination in a chuck as in claim 8, in which said sprocket is carried by said one clutch member.